United States Patent [19]

Owens

[11] 4,259,895
[45] Apr. 7, 1981

[54] VACUUM MOTOR

[76] Inventor: Roland G. Owens, 10850 Hull Rd., Hamburg, Mich. 48139

[21] Appl. No.: 47,035

[22] Filed: Jun. 11, 1979

[51] Int. Cl.³ .................... F01B 29/02; F15B 21/04; F16J 11/04
[52] U.S. Cl. .......................................... 92/78; 92/110; 92/130 R; 92/161; 92/163; 92/170; 92/171
[58] Field of Search .............. 92/78, 130 R, 135, 110, 92/161, 170, 163, 169, 171, 99, 130; 91/47; 123/117 A

[56] References Cited

U.S. PATENT DOCUMENTS

| | | | |
|---|---|---|---|
| 1,859,309 | 5/1932 | Mallory | 123/117 A |
| 2,015,374 | 9/1955 | Baker | 123/117 A |
| 2,177,767 | 10/1939 | Campbell | 92/78 |
| 3,023,739 | 3/1962 | Dickson, Jr. et al. | 92/110 X |
| 3,486,491 | 12/1969 | White | 123/117 A |
| 3,695,149 | 10/1972 | Eberhart | 92/170 |
| 4,020,749 | 5/1977 | Muller et al. | 92/99 X |

Primary Examiner—Irwin C. Cohen

Attorney, Agent, or Firm—Cullen, Sloman, Cantor, Grauer, Scott & Rutherford

[57] ABSTRACT

A vacuum motor includes a cylindrical housing with a mount plate at one end and an end wall at its other end terminating in a guide tube. A stem, adapted for connection to an intermittently actuated vacuum source projects into and is secured to the mount plate and is adapted for securing to a support. A cylinder is nested within the housing open at one end and at its other end is axially recessed to define with the mount plate a first vacuum chamber communicating with the stem bore. A hollow reciprocal piston open at one end is sealed within the cylinder a and terminates in a tubular piston rod which projects outwardly of the guide tube adapted for connection to a load to be moved a predetermined distance. The interior of the piston defines with the cylinder a power air chamber communicating with the piston rod and atmosphere. The piston defines with the housing end wall a second vacuum chamber which is in communication with the first vacuum chamber. A compression spring within the cylinder normally biases the piston to a retracted position.

12 Claims, 5 Drawing Figures

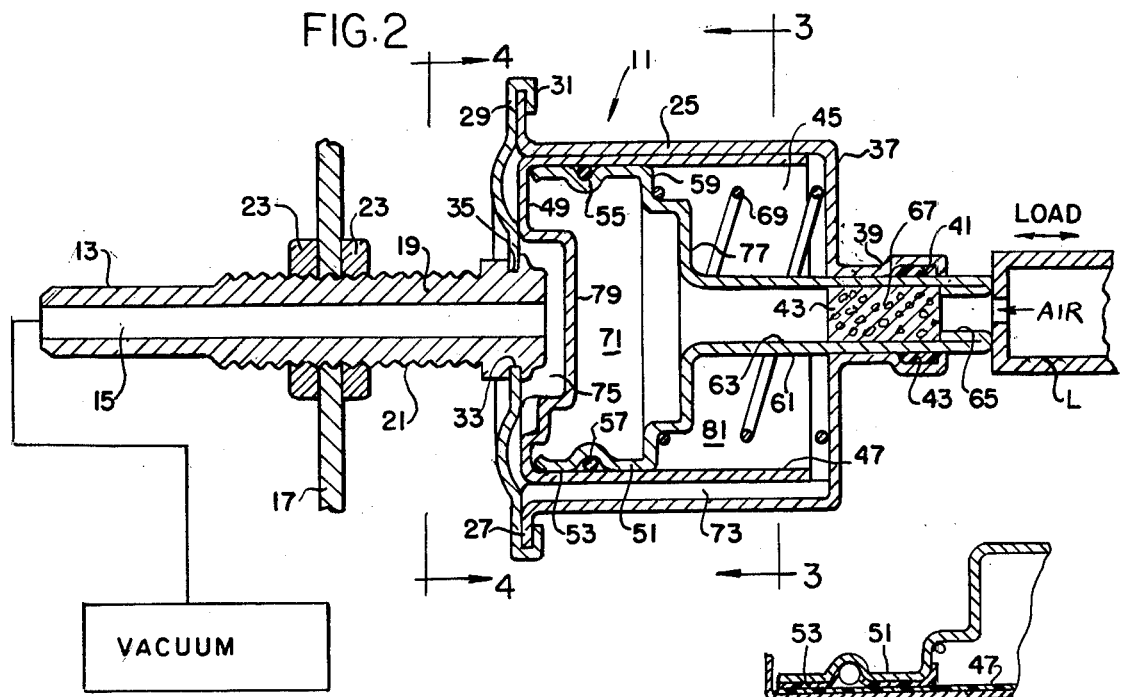
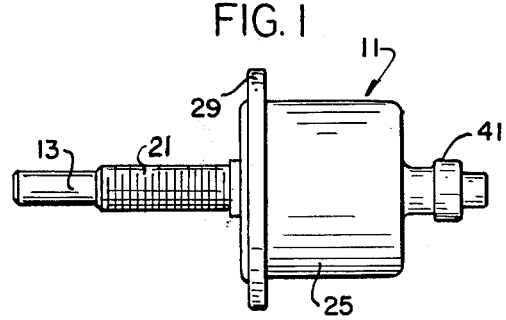
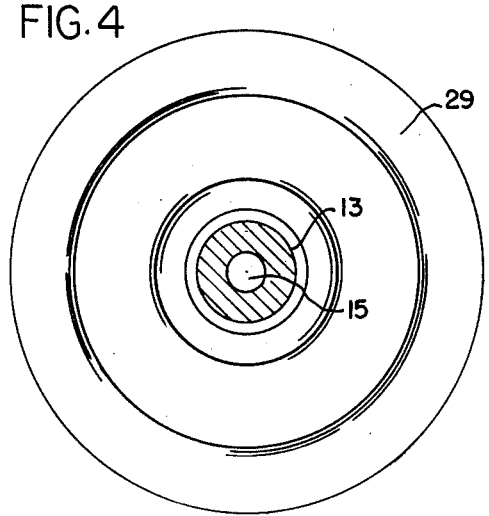
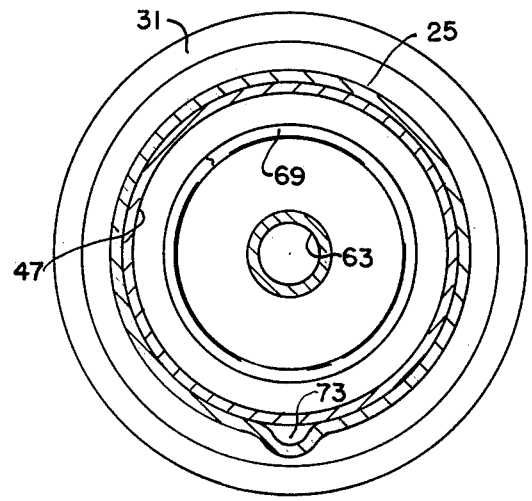
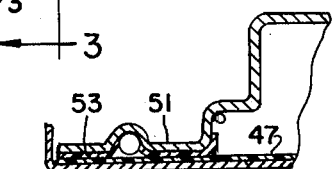

VACUUM MOTOR

BACKGROUND OF THE INVENTION

In the prior art there have been employed vacuum motors which include a flexible diaphragm connected to a load object to be advanced longitudinally. The use of diaphragms is often unpredictable and inaccurate as far as a guaranteed predetermined feed movement and due to the flexible characteristic of the diaphragm does not provide a positive acting feed mechanism.

SUMMARY OF THE INVENTION

The present invention is directed to a vacuum motor which replaces the flexible diaphragm with a reciprocal piston within a cylinder biased into a retracted position within the cylinder by a spring, and vacuum operated in the opposite direction for effecting a predetermined feed movement of the piston and connected piston rod for effecting a predetermined feed or other longitudinal movement of a work load. Examples of such load could be a throttle modulator for a vehicle, or an automatic choke or the longitudinal or other movement of a link controlling an operating device upon the vehicle such as various connections in an air conditioning or heating system therefor without excluding other purposes.

The present vacuum motor comprises a cylindrical housing having an axially apertured mount plate at one end and and end wall at its other end which terminates in an axially outturned guide tube. A stem having an axial bore and adapted for connection to an intermittently actuated vacuum source is connected to the housing mount plate said stem being adapted for mounting upon a suitable support.

A cylinder is snugly nested within the housing and has an open end which is spaced from the housing end wall with the other end of the cylinder bearing against the mount plate but being axially recessed to define with the mount plate a first vacuum chamber in communication with said vacuum source.

A hollow reciprocal piston is open at one end and sealed within the cylinder and terminates in an axially elongated tubular piston rod having a bore which slidably extends through the guide tube outwardly of the housing for connection to a load object to be advanced a predetermined distance.

The interior of the piston defines with the cylinder an air power chamber communicating with the piston rod bore and with atmosphere. The piston further defines with the housing end wall a second vacuum chamber.

A spring is interposed in compression between the piston and the housing normally biasing the piston into a retracted or inoperative position. The housing is formed with an internal elongated groove for interconnecting the vacuum chambers.

Activation of a vacuum source evacuates said vacuum chambers whereby atmospheric air within the air power chamber is effective to advance the piston longitudinally within the cylinder effecting a corresponding feed or longitudinal movement to the work load.

It is a further object to provide an improved seal relationship between the piston and cylinder wall and wherein corresponding cylinder wall and piston have been coated with Teflon or other suitable plastic for effecting an efficient seal therebetween.

These and other objects will be seen from the following Specification and Claims in conjunction with the appended drawing.

THE DRAWING

FIG. 1, is a side elevational view of the present vacuum motor.

FIG. 2, is a longitudinal section of the vacuum motor of FIG. 1, on an increased scale, with a vacuum source and a longitudinally movable load schematically shown and connected thereto.

FIG. 3, is a vertical section taken in the direction of arrows 3—3 of FIG. 2.

FIG. 4, is an end view of the vacuum motor shown in FIG. 2.

FIG. 5 is a fragmentary sectional view corresponding to FIG. 2, on an increased scale and illustrating the plastic coatings upon the cylinder end piston.

It will be understood that the above drawing illustrates merely a preferred embodiment of the invention, and that other embodiments are contemplated within the scope of the Claims hereafter set forth.

DETAILED DESCRIPTION OF AN EMBODIMENT OF THE INVENTION

Referring to the drawing, the vacuum motor is generally designated at 11, FIGS. 1 and 2 and includes an elongated stem 13 having an axial bore 15, and shank 19 threaded at 21, projected through a suitable support, such as bracket 17, and secured thereto by fasteners or lock nuts 23. Cylindrical housing 25 has a radial outturned annular flange 27. Said housing includes the transverse mount plate 29 at one end thereof which bears against said flange and includes peripheral portions which are reverse turned at 31 to compressively and retainingly engage around and seal against said flange.

Said mount plate is axially apertured at 33 with the adjacent portion thereof anchored within an annular groove 35 adjacent one end of the shank 19.

The opposite end of said housing has a radial end wall 37 which terminates in the axial outturned guide tube 39. The outer end of said guide tube has an undercut or annular internal recess 41 within which is nested an air filter such as the felt air filter 43.

Elongated cylinder 45 is snugly nested within said housing, has an open end spaced from the housing end wall. The opposite end 49 of said cylinder bears against mount plate 29 and is axially recessed as at 79 to define with said mount plate and stem a first vacuum chamber 75, FIG. 2.

The interior wall of said cylinder in one embodiment of the invention has a continuous plastic coating 47 of Teflon, for illustration.

The reciprocal piston 51 is hollow and in one embodiment of the invention has an exterior plastic coating 53 of Teflon, for illustration, for cooperative sealing engagement with the Teflon coating 47 on the interior of cylinder 45.

Another form of sealing of the piston within the cylinder includes an annular groove 55 within the piston wall within which is nested the resilient O-ring seal 57 for cooperative sealing engagement with the cylinder bore. Both types of sealing may be employed if desired.

Said piston has intermediate its ends an annular stop shoulder 59 and terminates in an axially elongated tubular piston rod 61 having a longitudinal bore 63. Said rod slidably extends through guide tube 39 and outwardly thereof adapted for connection to a load L, fragmentarily shown, which is adapted for a predetermined longitudinal movement.

The outer end of the piston rod is reverse turned at 65 providing an annular stop for retainingly engaging air filter 67 which is snugly nested within said piston rod intermediate its ends. In the illustrative embodiment the filter is constructed of felt material.

Coil compression spring 69 is nested within said cylinder and bears against end wall 37 at one end and at its opposite end bears against the stop shoulder 59 upon said piston normally biasing said piston to the retracted inoperative position shown in FIG. 2.

The interior of said piston in cooperation with the cylinder end wall 49 defines an air power chamber 71 in communication with the bore 63 of the piston rod and in communication with atmosphere. Said piston also defines with end wall 37 of said housing the second vacuum chamber 81.

Said piston includes the radial stop wall 77 normally spaced from housing end wall 37, and adapted on forward movement for limiting longitudinal forward movement of the piston rod and the load L connected thereto. There is formed upon the interior of housing 25 and along its length an elongated vacuum passage groove 73 which interconnects first vacuum chamber 75 with second vacuum chamber 81.

In the present vacuum motor housing 25, cylinder 45, piston 51 and piston rod 61 are all formed of sheet metal.

The housing 25 has a longitudinal axis as shown in FIG. 2. In the illustrative embodiment of the invention the vacuum channel groove 73 is arranged upon the interior of said housing and eccentric to said axis.

OPERATION

In operation with a vacuum of 19 inches of mercury, for example, applied to the bore of stem 13 chambers 75 and 81 are evacuated. Atmospheric air enters the piston rod through the filter 67 and enters the air power chamber 71. Atmospheric pressure therefore is applied to the piston and with respect to the evacuated chamber 81 with the result that the piston is adapted to feed longitudinally outward against the action of the spring 69 for a predetermined travel equal to the spacing between piston wall 77 and housing end wall 37, approximately. This distance can be predetermined and preset for a particular load movement. On disconnection of the intermittently applied vacuum source to the stem 13, the piston will automatically be retracted by said coil spring to the retracted position shown in FIG. 2.

The tolerances are such with respect to the formation of vacuum chambers 75 and 81 that in the illustrative embodiment there is no more than 0.01 CFM leakage with nineteen inches of mercury vacuum applied at the vacuum source.

Having described my invention reference should now be had to the following claims.

I Claim:

1. A vacuum motor comprising a cylindrical housing having a bore and an axially apertured mount plate at one end and an end wall at its other end terminating in an axially out-turned guide tube;
    an exteriorly threaded stem having an axial bore adapted for connection to an intermittenly actuated vacuum source;
    said stem at one end projecting through said mount plate and secured thereto, and intermediate its ends adapted for projection through a support;
    means adapted for securing the stem to said support;
    a cylinder snugly nested within said housing bore having an open end spaced from the housing end wall, the other end of said cylinder being closed and bearing against said mount plate and being axially recessed defining with said mount plate and stem a first vacuum chamber;
    a hollow reciprocal piston open at one end (and sealed) mounted within said cylinder, said piston terminating in an axially elongated tubular piston rod having a bore slidably extending through said guide tube and outwardly thereof adapted for connection to a load;
    means for sealing said piston within said cylinder;
    the interior of said piston defining with said cylinder and said closed other end an air power chamber communicating with the piston rod bore and with atmosphere;
    said piston defining with said housing end wall a second vacuum chamber;
    and spring means within said second vacuum chamber interposed between said housing end wall and piston normally biasing said piston into a retracted position;
    said housing being formed with an internal groove along its length defining with said cylinder a vacuum passage interconnecting said vacuum chambers.

2. In the vacuum motor of claim 1, said housing at said one end having an outturned annular flange;
    said mount plate snugly bearing against said flange and having a peripheral edge portion reversed turned over and compressively engaging said flange and secured thereto throughout 360°.

3. In the vacuum motor of claim 1, the securing of said stem to said mount plate including an annular groove in said stem snugly receiving the central apertured portion of said mount plate.

4. In the vacuum motor of claim 1, said support including an apertured bracket receiving said stem;
    said means for securing the stem including lock nuts threaded upon said stem in operative engagement with opposite sides of said bracket.

5. In the vacuum motor of claim 1, said housing, cylinder and piston being of sheet metal.

6. In the vacuum motor of claim 1, the sealing of said piston including an annular groove in said piston;
    and an O-ring seal nested within said groove 7. In the vacuum motor of claim 1, the sealing of said piston including a plastic coating upon the interior of said cylinder, and a plastic coating upon said piston.

8. In the vacuum motor of claim 7, said coating being Teflon.

9. In the vacuum motor of claim 1, a felt air filter nested and retained within the bore of said piston rod.

10. In the vacuum motor of claim 9, said guide tube having an annular internal recess therein adjacent said piston rod;
    and an annular felt air filter nested and retained within said recess for the filtration of atmospheric air entering said vacuum chamber.

11. In the vacuum motor of claim 1, said piston having an annular shoulder of reduced diameter;
    said spring means being a coiled compression spring guidably received by said shoulder.

12. In the vacuum motor of claim 1, said housing having a longitudinal axis;
    said vacuum passage groove being eccentric to the housing axis, and at one end in communication with the open end of said cylinder.

* * * * *